(12) United States Patent
Mizuno et al.

(10) Patent No.: US 6,569,365 B1
(45) Date of Patent: May 27, 2003

(54) PROCESS FOR MOLDING AN INTEGRAL SKIN FOAM (75) Inventors: Hisashi Mizuno, Ichinomiya (JP); Takahiro Yamada, Nagoya (JP); Yoshiharu Tsutsui, Ichinomiya (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 44 days.

(21) Appl. No.: 09/644,562

(22) Filed: Aug. 24, 2000

(30) Foreign Application Priority Data

Sep. 30, 1999 (JP) ............................. 11-279934

(51) Int. Cl.[7] .............................................. B29C 44/06
(52) U.S. Cl. .................... 264/45.5; 264/54; 264/102
(58) Field of Search .................... 264/45.5, 53, 102, 264/101, 54

(56) References Cited

U.S. PATENT DOCUMENTS

| | | | |
|---|---|---|---|
| 4,264,469 A | * 4/1981 | Yamaguchi et al. | ... 264/DIG. 5 |
| 4,522,955 A | * 6/1985 | Fukushima et al. | ........... 264/53 |
| 4,746,478 A | * 5/1988 | Fujisaki et al. | ............... 264/53 |
| 5,075,343 A | 12/1991 | Blount | |
| 5,283,003 A | 2/1994 | Chen | |
| 5,304,578 A | 4/1994 | Tamano et al. | ............... 521/51 |
| 5,336,696 A | 8/1994 | Ashida | |
| 5,367,045 A | 11/1994 | Takimoto | ..................... 528/53 |
| 5,476,619 A | 12/1995 | Nakamura | |
| 5,633,289 A | * 5/1997 | Nakamura et al. | ............. 521/51 |
| 5,770,635 A | * 6/1998 | Lee et al. | |

FOREIGN PATENT DOCUMENTS

| | | |
|---|---|---|
| CN | 1121091 A | 4/1996 |
| DE | 4447494 A | 5/1998 |
| DK | 4412976 | 11/1994 |
| EP | 0461522 A | 12/1991 |
| EP | 0559216 | 9/1993 |
| GB | 1253602 | 11/1971 |
| JP | 08012794 A | 6/1994 |
| JP | 08176251 A | 12/1994 |
| JP | 080269151 A | 3/1995 |
| JP | 080283365 A | 4/1995 |
| JP | 07-278332 | 10/1995 |
| JP | 08-269151 | 10/1996 |
| JP | 08-283365 | 10/1996 |

* cited by examiner

*Primary Examiner*—Allan R. Kuhns
(74) *Attorney, Agent, or Firm*—Posz & Bethards, PLC (57) ABSTRACT

A semi-rigid integral skin foam having a low foamed integral skin layer and a highly foamed core is molded from a polyurethane formulation injected into a mold cavity having a reduced pressure of 400 Torr or below. The formulation comprises a polyol component, an isocyanate component, and at least one substance selected from among formic acid, an amine salt thereof and an amine salt of boric acid, while not containing any freon.

3 Claims, 10 Drawing Sheets

//PROCESS FOR MOLDING AN INTEGRAL SKIN FOAM

BACKGROUND OF THE INVENTION

1. Field of the Invention

The present invention relates to a process for molding a semi-rigid integral skin foam (ISF), wherein the semi-rigid ISF comprises an integral skin (self-skin) region having a low degree of foaming and a core region having a high degree of foaming. The present invention further relates to a polyurethane formulation for molding such a foam, which is suitable for reaction injection molding (RIM) of a molded product having an ISF, such as a covering or pad for a steering wheel, an instrument panel, a console box lid, a glove box lid, a headrest, an armrest, or an air spoiler of a motor vehicle.

2. Description of Related Art

A conventional ISF has been molded by injecting a polyurethane formulation containing freon into a mold cavity and by expanding freon by the heat generated by a urethane-forming reaction. The use of freons has been, however, prohibited or restricted because of their effects on the environment.

Therefore, the applicant has previously proposed a novel process for molding an ISF without using any freon, as disclosed in Japanese Patent Application Laid-Open No. 226313/1992. According to that invention, the process comprises evacuating a mold cavity, injecting a polyurethane formulation into the cavity, and expanding the formulation so that it flows and fills the cavity. The polyurethane formulation contains 0.1 to 0.6 parts by weight of water for 100 parts by weight of a polyol component. It was considered preferable to evacuate the mold cavity to 100 Torr or below if the amount of water is 0.1 parts by weight, and 400 Torr or below if the amount of water is 0.6 parts by weight.

When the process mentioned above was carried out by varying the amount of water in the polyurethane formulation and the degree of vacuum in the mold cavity, it was possible to obtain different degrees of foaming and thereby mold an ISF having cores which differed in density from one another. However, when the mold cavity was evacuated to 100 Torr or below to form a core having a low density of 0.6 g/cm³ or less, it was impossible to make products having a good appearance, as such products looked depressed by shrinkage of the core or skin.

The present inventors also tried to form a low density core by increasing the water amount, or by introducing air bubbles by air loading. In either event, however, it was impossible to make products having a good appearance, because of an increase of defects, such as bulging and voids, on the core and skin, although the core was of low density.

As a result of further research, however, the present inventors have found that a polyurethane formulation containing another particular substance can be used to make a product having a core density as low as not exceeding about 0.6 g/cm³, and yet presenting a good appearance not spoiled by defects, such as shrinkage, bulging or voids.

SUMMARY OF THE INVENTION

It is, therefore, an object of this invention to form an ISF having a core of low density and presenting a good appearance not spoiled by defects, such as shrinkage, bulging or voids.

This object is attained by a process for molding a semi-rigid ISF having a low foamed integral skin layer and a highly foamed core, which comprises the steps of evacuating a mold cavity to 400 Torr or below, injecting into the cavity a polyurethane formulation comprising a polyol component, an isocyanate component, and at least one substance selected from the group consisting of formic acid, an amine salt of formic acid and an amine salt of boric acid, while not containing any freon, and foaming the polyurethane formulation to fill the cavity and thereby form the ISF.

The term "polyol component" means "a composition comprising at least one polyol", while the term "isocyanate component" means "a composition comprising at least one polyisocyanate". "Freon" means "blowing agents that comprise halogen atoms".

A cavity pressure of 400 Torr or below is essential for forming a core of low density, and a pressure of 100 Torr or below is preferable for ensuring a core density of 0.6 g/cm³ or less.

This invention also relates to a polyurethane formulation for a semi-rigid ISF having a low foamed integral skin layer and a highly foamed core, which comprises a polyol component, an isocyanate component, and at least one substance selected from the group consisting of formic acid, an amine salt of formic acid and an amine salt of boric acid, while not containing any freon.

In either event, the polyurethane formulation preferably has a water content not exceeding one part, and more preferably not exceeding 0.6 part, by weight relative to 100 parts by weight of polyol component so as to ensure the manufacture of a product having no defect such as bulging or voids. The amount of water content as defined includes both the water which is absorbed inevitably from the environment (normally in the range of 0.1 to 0.15 part by weight), and what has been added to it.

The polyurethane formulation is foamed mainly by the rapid bumping of the occluded (absorbed) gases therein at a reduced pressure if it has a low water content (for example, below 0.1 part by weight). The occluded gases include slight amounts of gases existing in the polyurethane formulation from the beginning, and a small amount of air entrained or dissolved within it during its circulation. Its foaming is also caused to some extent by a water-isocyanate reaction as described below.

If it has a high water content (such as, 0.1 part by weight or more), the polyurethane formulation's foaming is caused mainly by the expansion at a reduced pressure of $CO_2$ bubbles formed by the reaction of water and an isocyanate in the polyurethane formulation, which is promoted by the heat of a urethane reaction. Its foaming is, however, also caused to some extent physically by the boiling of water (having its boiling point lowered at a reduced pressure) and its vaporization, and by the bumping of the occluded gases.

In either event, the polyurethane formulation at the center of the mold cavity, which is away from the wall surface of the mold cavity, forms a core having a low density. The polyurethane formulation close to the wall surface of the mold cavity is easily debubbled at a reduced pressure, because the reaction heat dissipates through the wall surface of the mold cavity to thereby delay its urethane reaction and thickening. This results in the formation of a skin having a high density (or having a low degree of foaming).

The pressure in the mold cavity (vacuum degree) is 400 Torr or below for obtaining a core of low density, and a pressure of 100 Torr or below is preferable.

Examples of the amine salts of formic acid which can be used for the purpose of this invention are a salt of formic acid and bis (2-dimethylaminoethyl) ether (BDAEE), a salt of formic acid and triethylenediamine (TEDA), a quaternary ammonium salt of formic acid and a salt of formic acid and 1,8-diaza-bicyclo (5,4,0) undecene-7 (DBU). A mixture of two or more such salts can also be employed.

A salt of boric acid and BDAEE is an example of the amine salts of boric acid which can be employed.

At least one substance selected from the group consisting of formic acid, an amine salt of formic acid and an amine salt of boric acid is preferably employed in the amount of 0.03 to 5.0 parts by weight per 100 parts by weight of polyol component, though its amount may depend on which is employed, and the foaming degree required of the core. The use of a smaller amount may not bring about a satisfactory result in preventing the occurrence of defects as stated above, while the use of a larger amount is uneconomical, as such leads to hardly any better result.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrated and not seen to limit the scope of the invention.

DETAILED DESCRIPTION OF THE PREFERRED EMBODIMENTS

Figure 1:
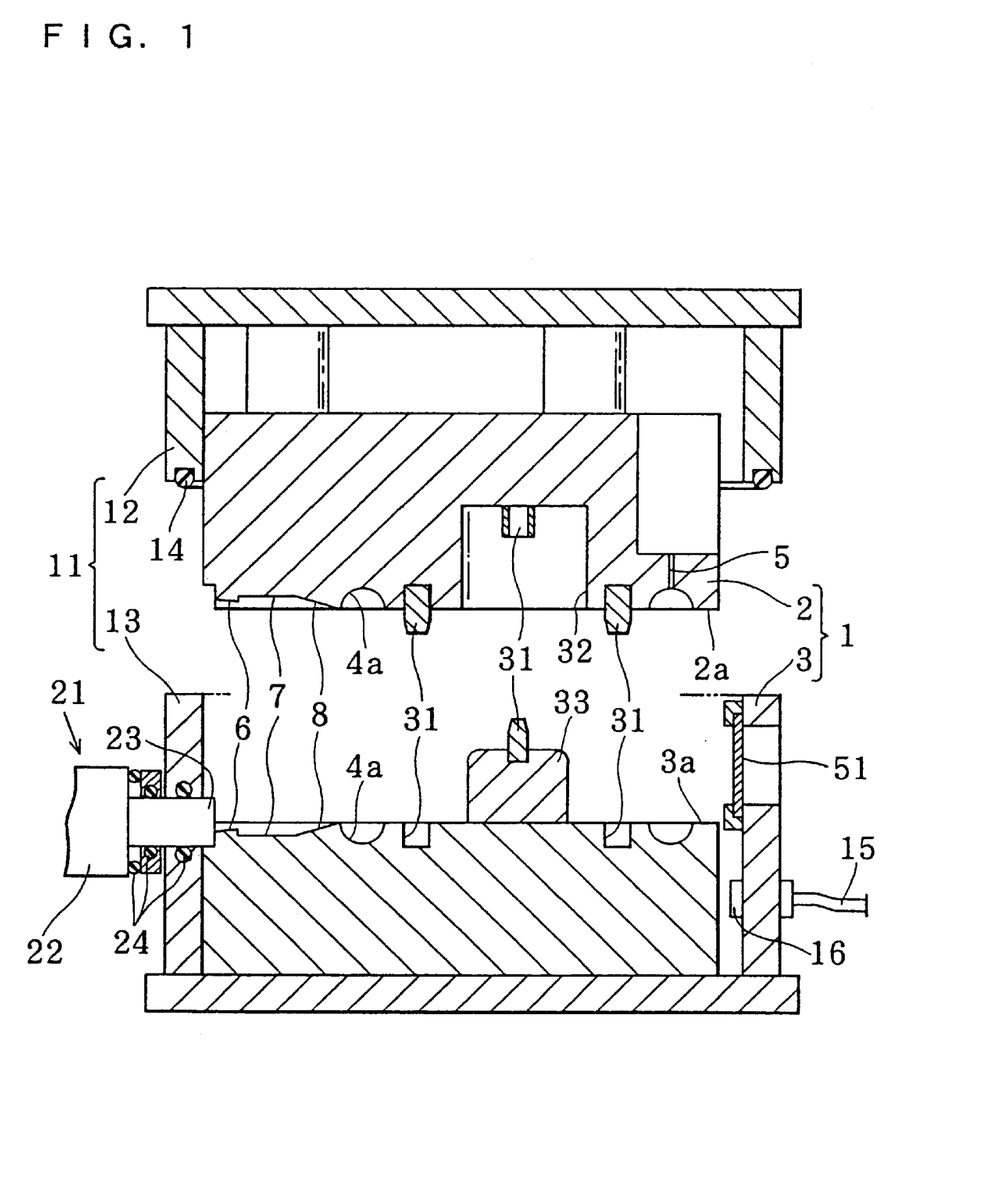
FIG. 1 is a sectional view showing a mold and a vacuum chamber in their open positions used for RIM of an ISF covering for a steering wheel in accordance with a first embodiment of the present invention.
Figure 2:
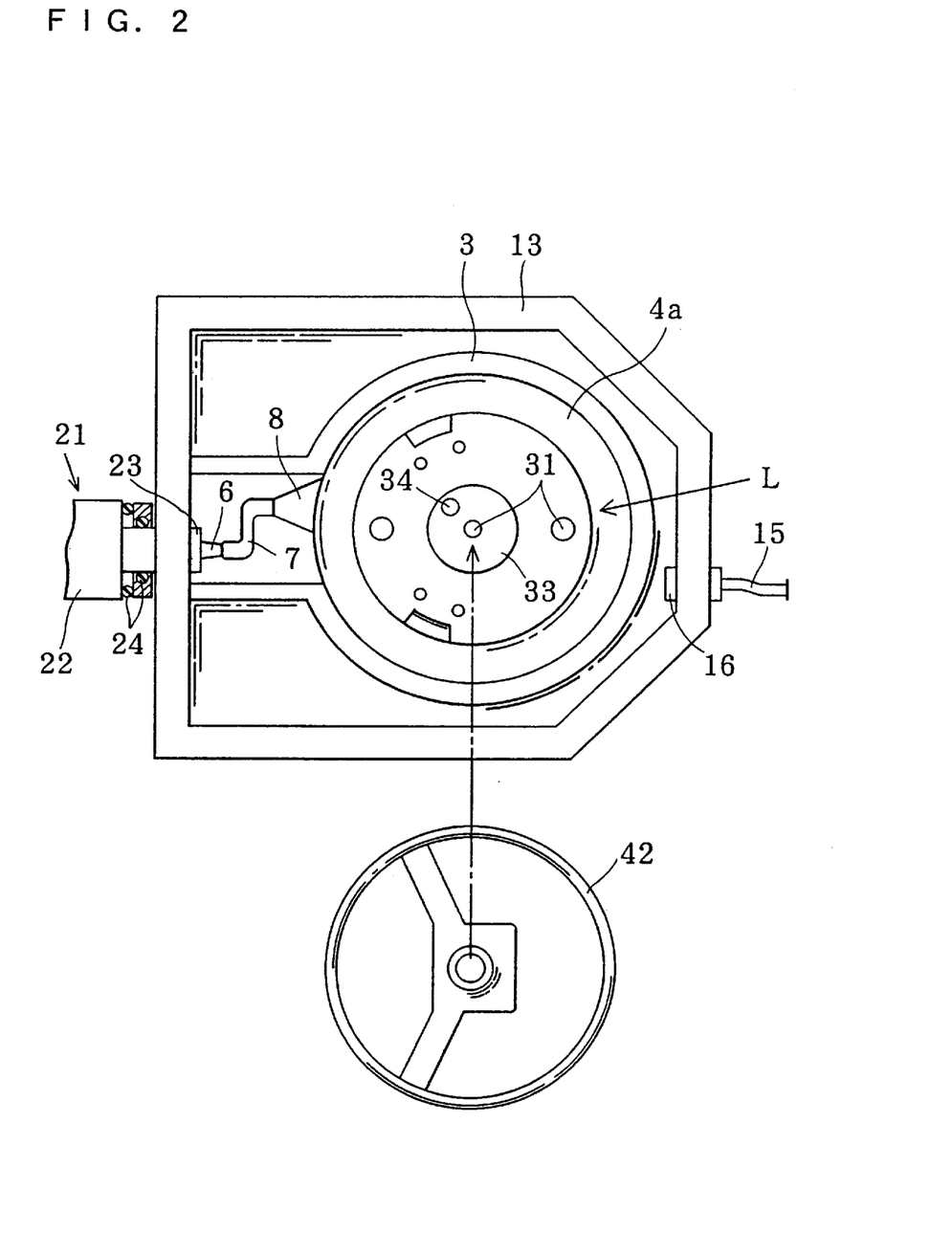
FIG. 2 is a top plan view showing a movable portion of the mold and a lower casing of the vacuum chamber.
Figure 3:
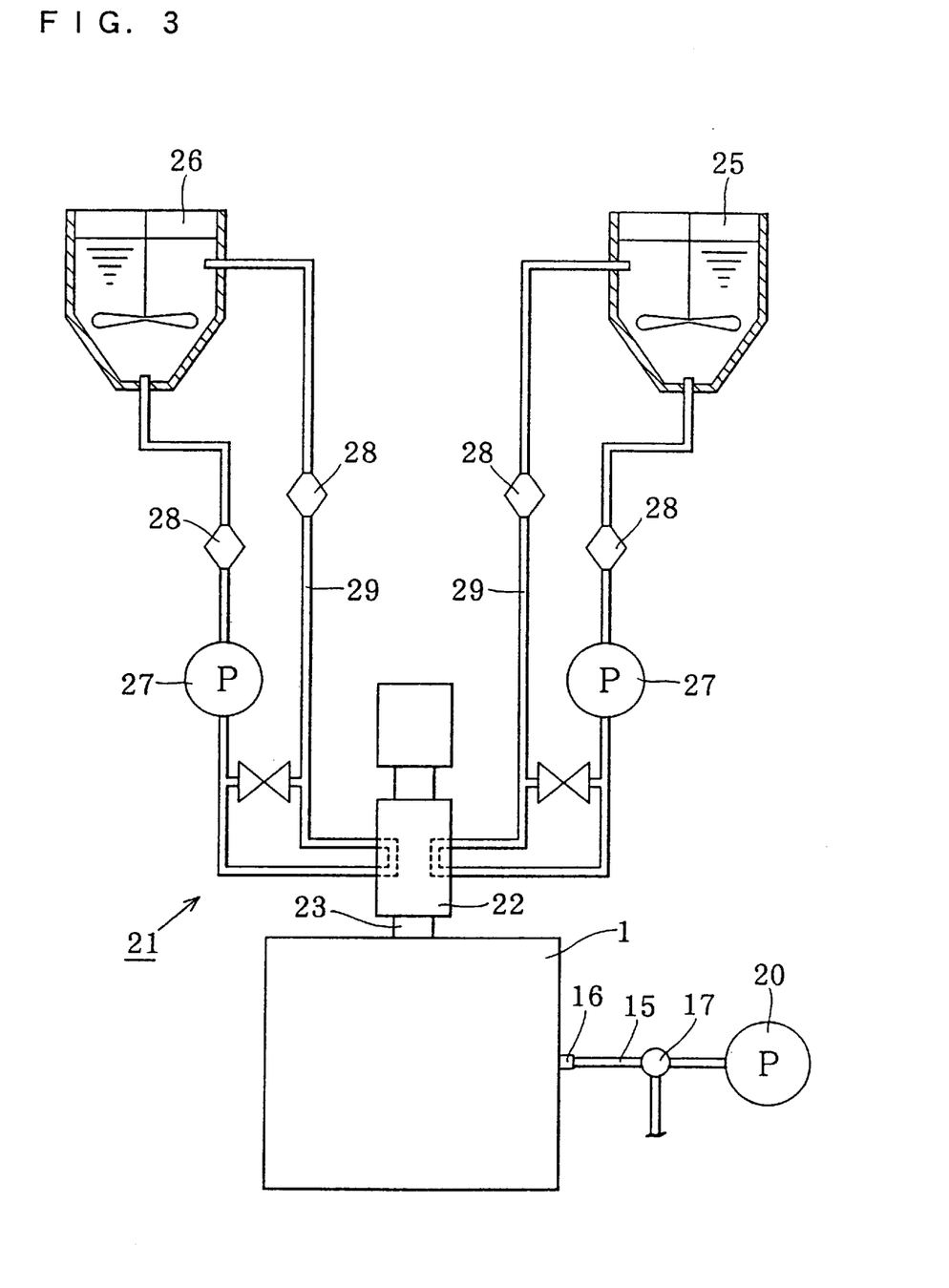
FIG. 3 is a schematic diagram showing an injection mechanism.

A first embodiment of the present invention for the production of an ISF covering of a steering wheel will be described with reference to FIGS. 1 to 8. As shown in FIGS. 1 to 3, this embodiment employs molding apparatus which comprises a mold 1 composed of 2 split molds, a vacuum chamber 11 in which the mold 1 can be arranged, a vacuum pump 20 to evacuate the vacuum chamber 11, and a formulation injection mechanism 21 which is attached to the vacuum chamber 11 and is intended to inject a polyurethane formulation into the cavity 4 of the mold 1. A metal core 42 of a steering wheel 41 used in this embodiment is composed of a ring, spokes, and a boss at the center of the core. An ISF covering 43 is formed around the entire ring and part of the spokes.

The mold 1 comprises an upper stationary portion 2 and a lower movable portion 3 with grooves 4a formed in their parting surfaces, respectively, for defining a substantially annular cavity 4 therebetween when they are closed. At the center of the cross-section of cavity 4 is placed the entire ring of the metal core 42 and at least a portion of its spokes. The PL (parting line) surface 2a of the stationary portion 2 and the PL surface 3a of the movable portion 3 are recessed to form a sprue 6, runner 7 and gate 8 through which the polyurethane formulation is injected into the cavity 4. The gate 8 opens on the outer periphery of the groove 4a at the left side in FIG. 2. Upon injection into the cavity 4 through the gate 8, the polyurethane formulation M flows in two directions within cavity 4 and the two flows meet at position L at the right side in FIG. 2 where the filling of the cavity is completed.

A vent hole 5 is formed at the final filling position L in the stationary portion 2. The vent hole 5 usually has a diameter of 1 to 10 mm. With a diameter smaller than 1 mm, the vent hole 5 does not perform venting as desired, in case the final filling position L of the polyurethane formulation fluctuates. With a diameter larger than 10 mm, the vent hole 5 leaves a noticeable vent mark after finishing of the molded product, thereby spoiling its outward appearance. The vent hole 5 in this embodiment is a straight one, 15 mm long and 3 mm in diameter. When the mold is closed, there will be a clearance of about 0.03 to 0.06 mm between the PL surfaces 2a and 3a over the entire periphery of the cavity 4 due to the limit of machining precision. This clearance functions as an air vent land for venting, described further below.

Inside each groove 4a of the stationary portion 2 and the movable portion 3 are mating parts 31 to align the two portions 2, 3, and a recess 32 and pedestal 33 to hold in position the boss of the metal core 42. The pedestal 33 is provided with an ejector pin 34 embedded therein so as to project therefrom to release the steering wheel 41 as molded.

The mold 1 may be made of aluminum or electroformed for economy, since it is not required to have a very high pressure resistance, but is only required to withstand a foaming pressure of approximately 50 to 500 kPa.

The vacuum chamber 11 is made up of an upper casing 12 to which the stationary portion 2 is fixed and a lower casing 13 to which the movable portion 3 is fixed. A mounting slot, formed in the mating surface of the upper casing 12, is provided with a sealing member 14 in the form of an O-ring, which makes the closed vacuum chamber 11 airtight. The lower casing 13 is provided with a suction port 16, which is connected to a vacuum pump 20 through a suction hose 15 and a leak valve 17, as shown in FIGS. 1 to 3. The vacuum chamber 11 is constructed such that it can accommodate the mold 1, forming a space K therein.

Figure 5:
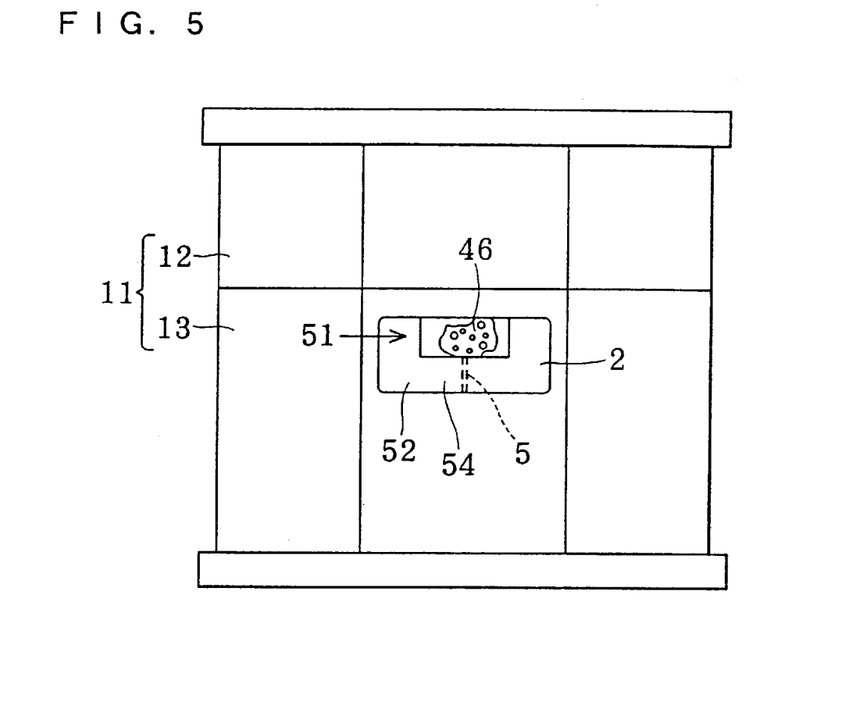
FIG. 5 is a side elevational view of FIG. 4 showing a sight glass.
Figure 6:
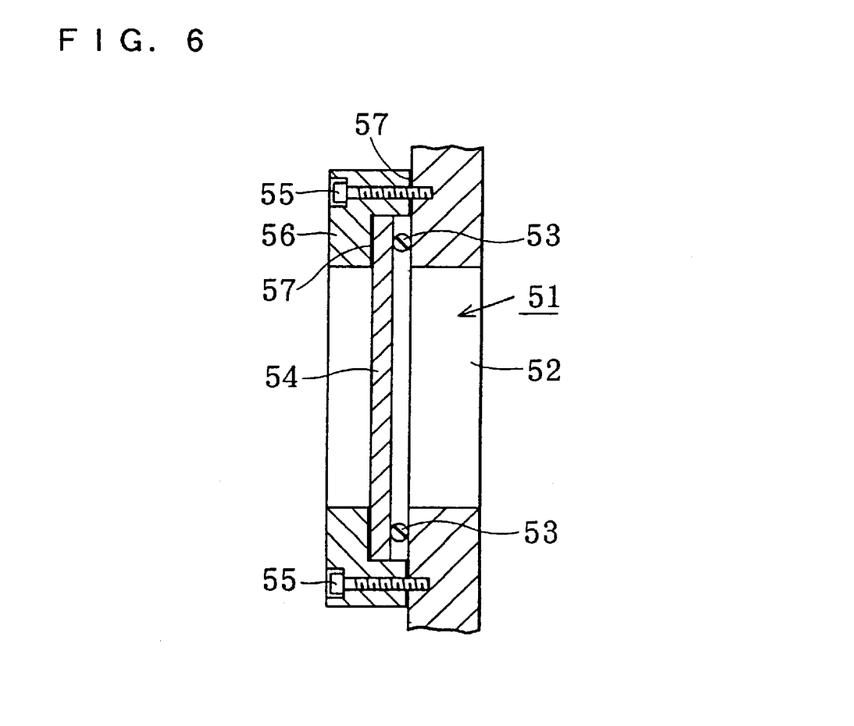
FIG. 6 is a partly enlarged sectional view of FIG. 4 showing the sight glass.

The lower casing 13 of the vacuum chamber 11 is provided with a sight glass 51 which makes the vicinity of the vent hole 5 visible from the outside of the lower casing 13, as shown in FIGS. 5 and 6. The sight glass 51 is made up of an opening 52 formed in the lower casing 13, a transparent plate 54 of glass or plastic which is pressed against the inside of the lower casing 13 with a seal ring 53 placed between them, so as to close the opening 52 from the inside, and a frame 56 which is fastened to the lower casing 13 by bolts 55 such that it presses the periphery of the transparent plate 54. It is desirable to place a gasket 57 between the frame 56 and the transparent plate 54, and between the frame 56 and the lower casing 13.

The stationary portion 2 and the upper casing 12 are integrally constructed, and the movable portion 3 and the lower casing 13 are also integrally constructed. The lower casing 13 is connected to a hydraulic cylinder ram (not shown), so that it is raised and lowered, as the mold is closed and opened, respectively. At the time of mold closing, the lower casing 13 is raised until its periphery comes into contact with the periphery of the upper casing 12.

The formulation injection mechanism 21 includes a mixing head 22 to which a polyol reservoir 25 and an isocyanate reservoir 26 are each connected by a circuit 29 having a high-pressure pump 27 and filters 28, as shown in FIG. 3, so that the mixing and circulation of the polyol and isocyanate may be repeated. The mixing head 22 has an injection nozzle 23 fitted with O-rings 24 and adapted so as to be connected to the sprue 6 in the mold 1, as shown in, e.g., FIG. 1.

A polyurethane formulation used in this embodiment comprises a polyol component, an isocyanate component, at least one substance selected from the group consisting of formic acid, an amine salt of formic acid and an amine salt of boric acid, and further comprises not more than 1.0 parts by weight of water for 100 parts by weight of the polyol component, and does not comprise freon.

The sequence of operation in this embodiment is described below.

(1) First, with the mold 1 open as shown in FIG. 1, the metal core 42 is set in the movable portion 3 as shown in FIG. 2.

Figure 4:
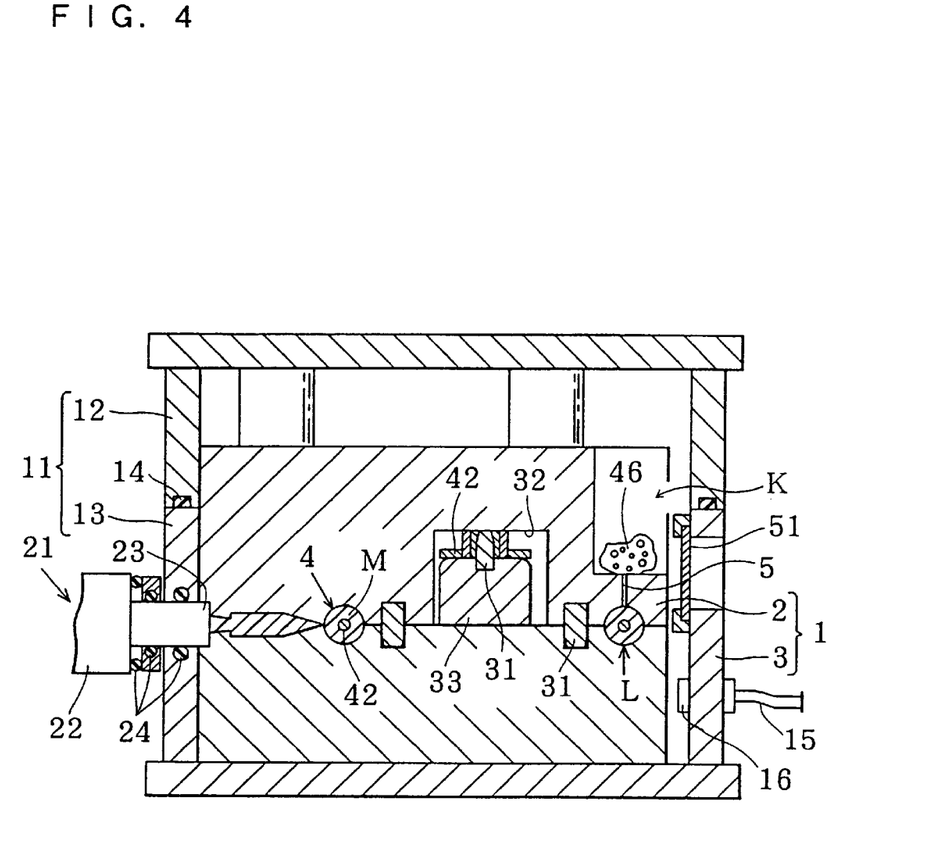
FIG. 4 is a sectional view showing the mold and the vacuum chamber as closed for RIM.

(2) The mold 1 is closed to form the cavity 4, and almost simultaneously, the vacuum chamber 11 is closed airtight, as shown in FIG. 4. According to this embodiment, the lower casing 13 is raised by a hydraulic cylinder ram (not shown) until the sealing member 14 comes into contact with the mating surface of the upper casing 12, so as to close the vacuum chamber 11 airtight, and simultaneously the stationary portion 2 and the movable portion 3 are closed. Incidentally, it is possible to close and open the mold 1 and the vacuum chamber 11 independently using separate hydraulic cylinders, so that it is also possible to close and open the mold 1 and the vacuum chamber 11 simultaneously or separately.

(3) Then, the vacuum pump (20) is put in operation so as to evacuate the space K in the vacuum chamber 11 to 400 Torr or below (preferably, 100 Torr or below) through the suction port 16. During this step, the cavity 4 is in communication with the space K in the vacuum chamber 11 through the clearance between the PL surfaces 2a and 3a, the passage for the formulation including the sprue 6, and the vent hole 5. Therefore, the cavity 4 is also evacuated to almost the same vacuum degree as in the space K.

(4) With the evacuation being continued, the polyurethane formulation M is injected for RIM into the cavity 4 through the injection nozzle 23, as shown in FIG. 4.

Figure 8:
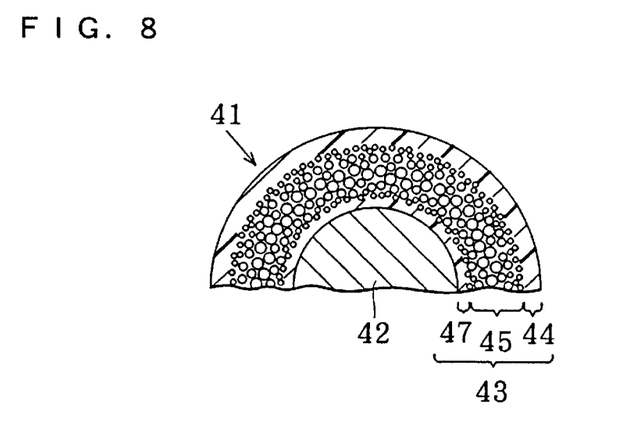
FIG. 8 is a partly enlarged sectional view of the ISF covering as shown in FIG. 7.
Figure 9:
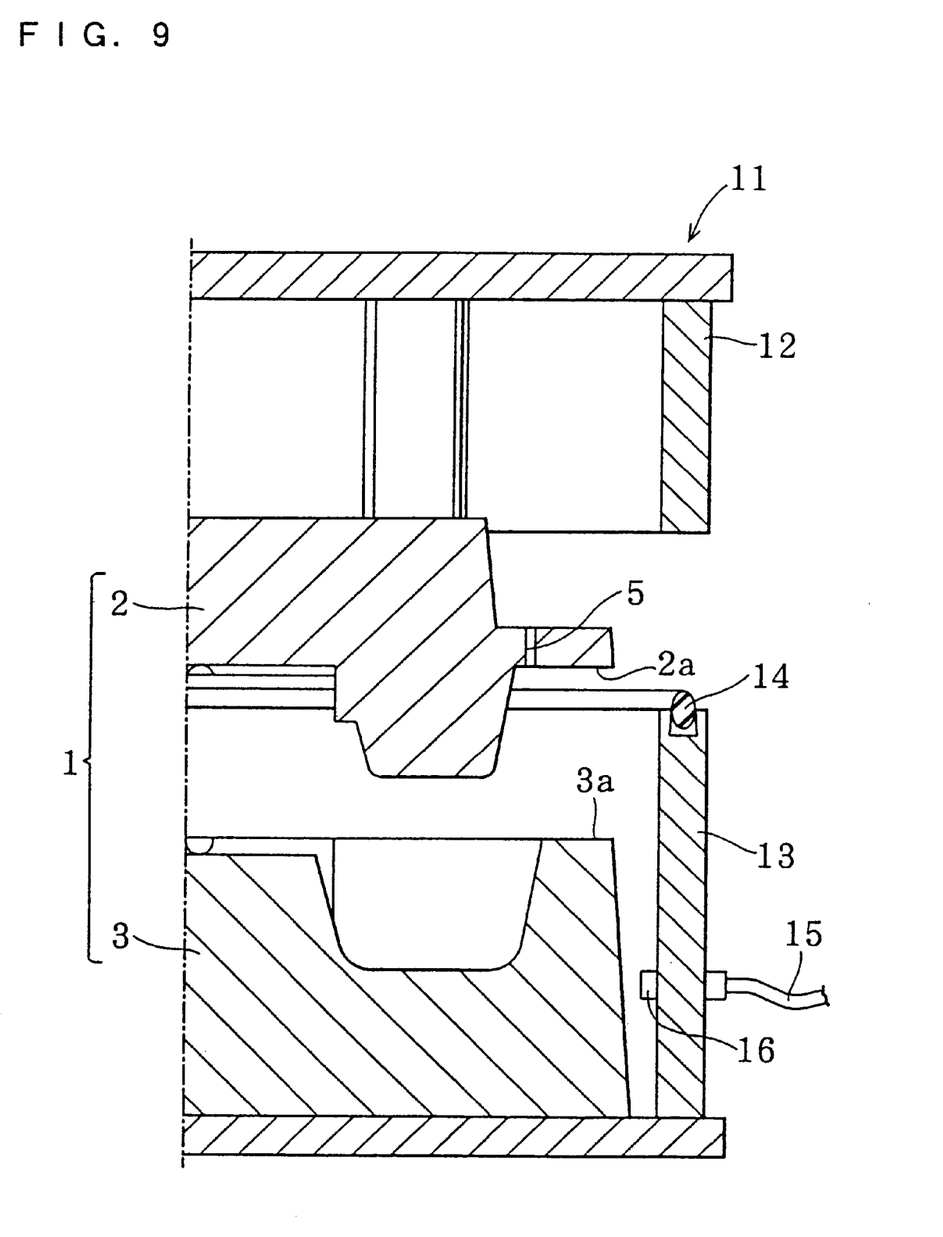
FIG. 9 is a sectional view showing a mold and a vacuum chamber in their open positions used for RIM of an ISF pad for a steering wheel in accordance with a second embodiment of the present invention.
Figure 10:
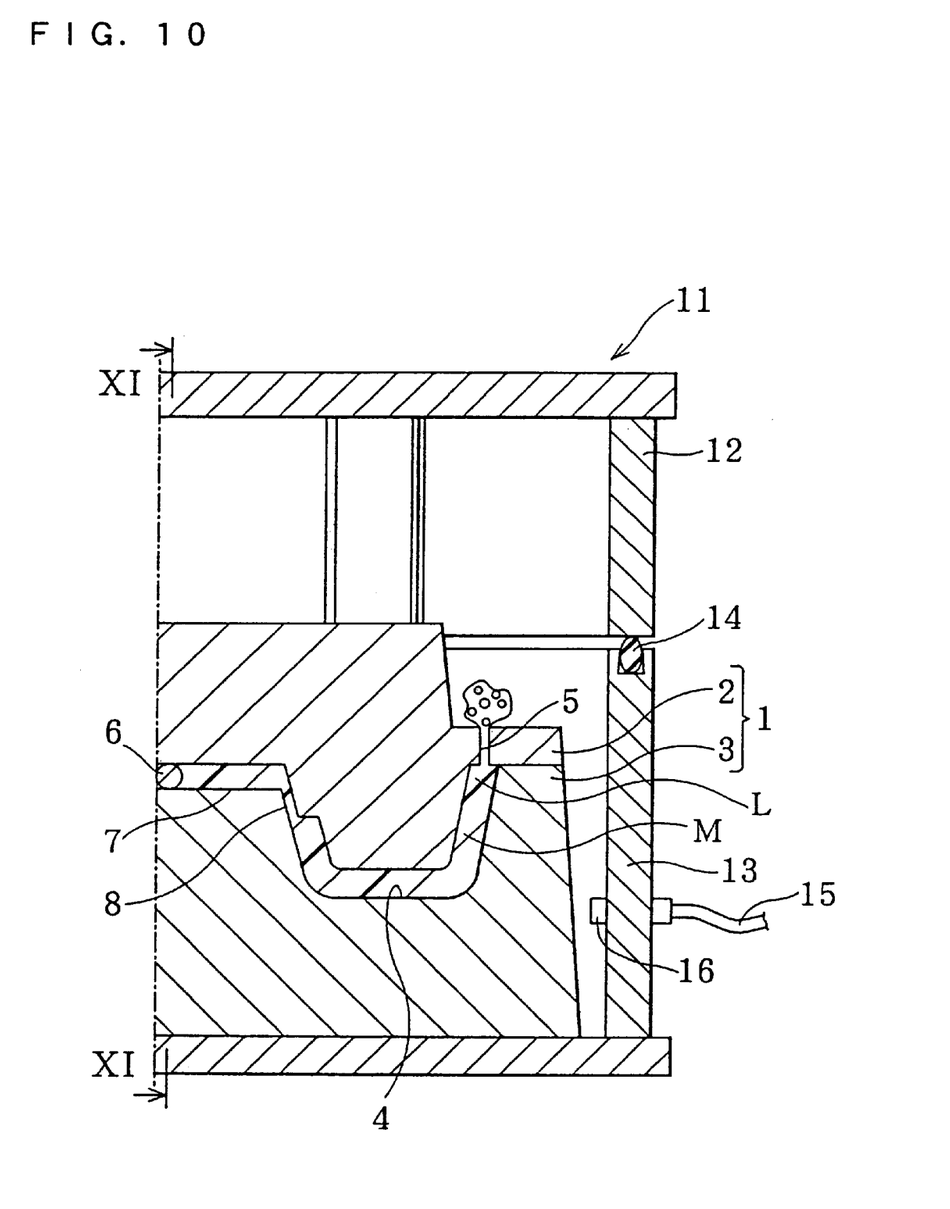
FIG. 10 is a sectional view showing the mold and the vacuum chamber as closed for RIM.
Figure 11:
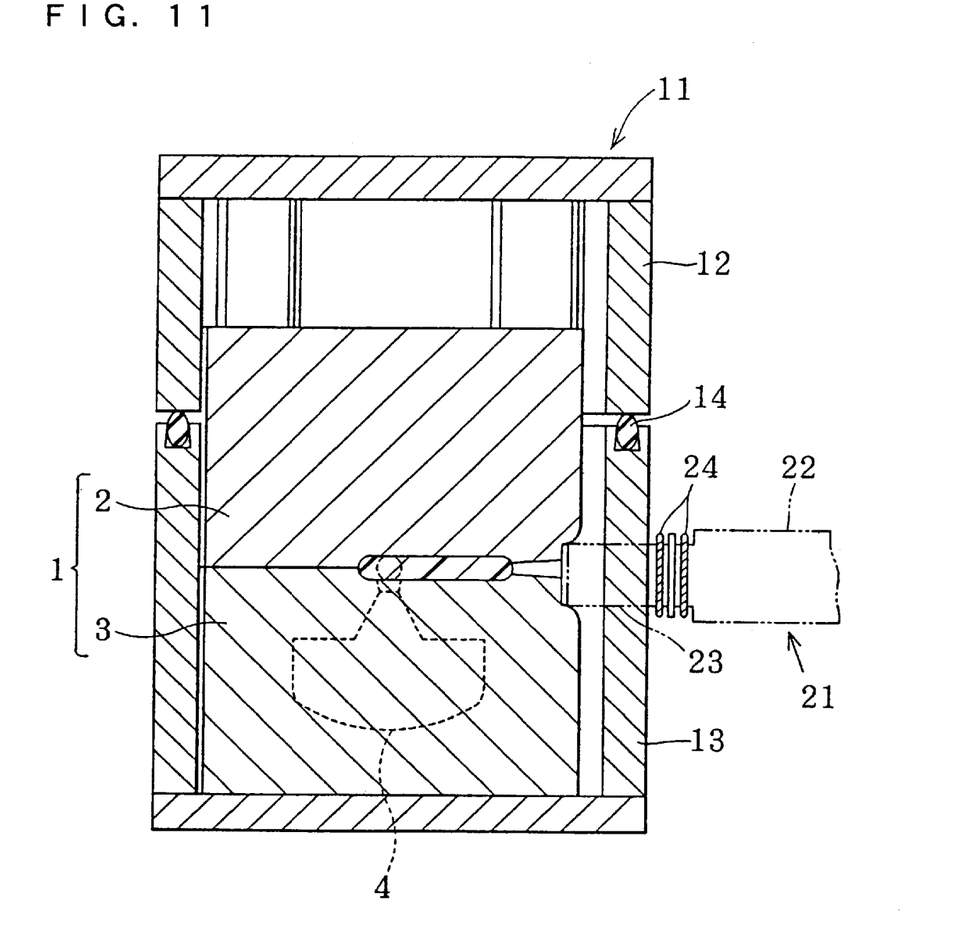
FIG. 11 is a sectional view taken along line XI—XI of FIG. 10.

At the center, which is away from the wall surface of the cavity and the metal core 42, the injected polyurethane formulation M forms a core 45 having a high degree of foaming and low density (as shown in FIG. 8) owing to the above-described foaming. The polyurethane formulation M close to the wall surface of the cavity forms a solid integral (self) skin 44 having a low degree of foaming such that virtually no bubbles remain therein (as shown in FIG. 8) by the above-described debubbling. The polyurethane formulation M close to the metal core 42 also forms a solid adhesive layer 47 having a low degree of foaming (as shown in FIG. 8) by the debubbling described above. Usually, the adhesive layer 47 is slightly thinner than the skin 44.

As the polyurethane formulation M flows in the cavity, it seals the clearance between the PL surfaces 2a and 3a. The reaction rate of the polyurethane formulation M is controlled such that as soon as the forward end of the flowing polyurethane formulation M reaches the final filling position L and slightly blows off from the vent hole 5, it cures to seal the vent hole 5.

According to this embodiment, one can observe what is happening in the vicinity of the vent hole 5 through the sight glass 51 from the outside of the vacuum chamber 11, as shown in FIG. 5. That is, one can see the polyurethane formulation M blowing off from the vent hole 5 or foaming, while keeping the vacuum chamber 11 closed.

An additional effect of evacuating the cavity 4 is that the air within the cavity 4, which hinders the flow of the polyurethane formulation M, is thinned. Thus, the system is designed so that the polyurethane formulation M completely fills undercuts and branches in the cavity 4. Further, gases occluded in the polyurethane formulation are debubbled to be discharged through the vent hole 5 and the clearance between the PL surfaces 2a and 3a. This eliminates the necessity of overpacking the polyurethane formulation, unlike the conventional freon-based foaming, and thereby reduces the loss of formulation.

Figure 7:
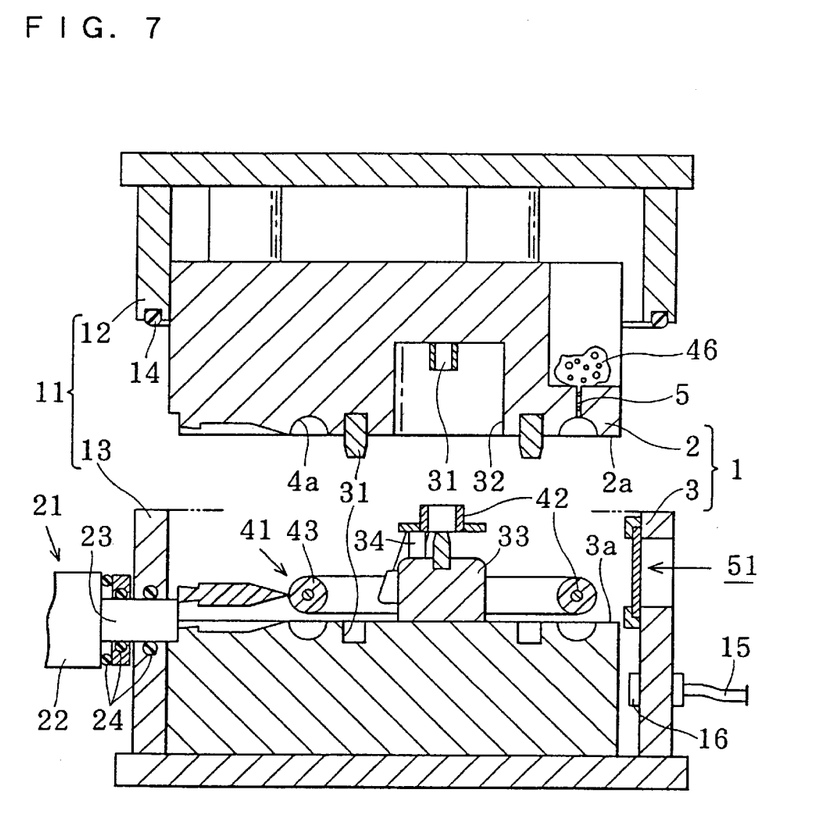
FIG. 7 is a sectional view of the mold and the vacuum chamber as opened, and an ISF covering as released from the mold.

When the polyurethane formulation M has cured in the cavity, the mold 1 is opened and simultaneously the vacuum chamber 11 is opened, as shown in FIG. 7. The mold opening action is interlocked with the ejector pin 34 which automatically releases the finished steering wheel 41 having the ISF covering 43.

According to the process and polyurethane formulation of this embodiment, the following effects can be obtained. Namely, although the cavity 4 has a high vacuum degree corresponding to a pressure of 400 Torr or below (and preferably 100 Torr or below) to form the core 45 having a low density of preferably 0.6 g/cm$^3$ or less, the molded product has a good appearance that is hardly spoiled by any defect, such as shrinkage, bulging or voids, owing to its formulation containing at least one substance selected from the group consisting of formic acid, an amine salt of formic acid and an amine salt of boric acid. The reaction thereof with the isocyanate, in which formic acid, for example, acts as a foaming assistant, produces $CO_2$ bubbles, and enables not only a high foaming degree, but also the formation of a foam composed of fine cells and highly resistant to shrinkage, as compared with a foam formed only by the water-isocyanate reaction, or the bumping of the occluded gases.

Moreover, according to this embodiment, the following effects (a) to (c), which are particularly suitable for molding the ISF covering 43 for the steering wheel 41, can also be obtained.

Moreover, the process embodying this invention is beneficial for forming the ISF covering 43 on the steering wheel 41 for the reasons stated in (a) to (c) below.

(a) The polyurethane formulation M is subject to turbulence owing to the long ring of the metal core 42, and turbulence normally causes defects such as pinholes, voids and short shots. In this embodiment, however, the polyurethane formulation M is less liable to turbulence because the cavity 4 is evacuated to thin the air therein. This permits one to select the position of the gate 8 more freely. In this embodiment, the gate 8 is on the outer periphery of the ring and there is only one vent hole 5.

(b) The injected polyurethane formulation M normally flows in two directions and the two flows meet at the final fill position L, as described above. The flow in this manner used to cause a weld line at the meeting point and to entrap gases which lead to defects such as pinholes, voids and short shot. In this embodiment, however, this problem is solved because the cavity 4 is evacuated and the polyurethane formulation at the meeting point blows of f from the vent hole 5.

(c) In this embodiment, the ISF covering 43 firmly adheres to the ring of the metal core 42, because the solid adhesive layer 47 containing very few minute bubbles is formed on the surface of the core 42.

Polyurethane formulations were prepared as Examples 1 to 10 embodying this invention to ascertain its advantages. Each formulation was prepared by mixing a basic composition as shown in Table 1 and an additive (formic acid, an amine salt thereof, or an amine salt of boric acid) in the proportion shown in Table 2 as part or parts by weight (relative to 100 parts by weight of polyol component). More specifically, the additive was added to the polyol mixture component in the basic composition, and the polyol mixture component was mixed with the isocyanate component by impingement in the mixing head 22. Polyurethane formulations were also prepared as Comparative Examples 1 to 9 for comparison with those embodying this invention, each by mixing a basic composition as shown in Table 1 and an additive (other than formic acid, an amine salt thereof, and an amine salt of boric acid) in the proportion shown in Table 3 as part or parts by weight (relative to 100 parts by weight of polyol component).

TABLE 1

| Basic composition | Polyol mixture component | Polyether polyol having an average molecular weight of 4000 (parts) | 100 |
| --- | --- | --- | --- |
| | | Diethylene glycol (parts) | 18 |
| | | Triethylenediamine (parts) | 0.8 |
| | | Pigment (parts) | 6 |
| | Isocyanate component | MDI prepolymer (NCO 28%) (parts) | 68 |

TABLE 2

| | Example 1 | Example 2 | Example 3 | Example 4 | Example 5 | Example 6 | Example 7 | Example 8 | Example 9 | Example 10 |
| --- | --- | --- | --- | --- | --- | --- | --- | --- | --- | --- |
| Additive (parts) | | | | | | | | | | |
| Formic acid | 0.05 | 0.1 | 0.2 | — | — | — | — | — | — | — |
| BDAEE salt of formic acid | — | — | — | 0.2 | 0.5 | 1.0 | — | — | — | — |
| TEDA salt of formic acid | — | — | — | — | — | — | 0.5 | — | — | — |
| Quaternary ammonium salt of formic acid | — | — | — | — | — | — | — | 0.5 | — | — |
| DBU salt of formic acid | — | — | — | — | — | — | — | — | 0.5 | — |
| BDAEE salt of boric acid | — | — | — | — | — | — | — | — | — | 2.0 |
| Molding conditions | | | | | | | | | | |
| Vacuum degree (Torr) | 10, 30, 50 | 10, 30, 50 | 10, 30, 50 | 30 | 10, 30, 50, 100 | 30 | 30 | 30 | 30 | 10, 50 |
| Water content (parts) | 0.3 | 0.3 | 0.3 | 0.3 | 02, 04 | 0.3 | 0.3 | 0.3 | 0.3 | 0.3 |
| Molding results | | | | | | | | | | |
| Density (g/cm$^3$) | 0.5 | 0.5 | 0.5 | 0.55 | 0.5 | 0.5 | 0.55 | 0.55 | 0.6 | 0.5 |
| Appearance | OK | OK | OK | OK | OK | OK | OK | OK | OK | OK |

TABLE 3

| | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 |
| --- | --- | --- | --- | --- | --- | --- | --- | --- | --- |
| Additive (parts) | | | | | | | | | |
| Quaternary ammonium 2-ethylhexanoate | — | — | 0.5 | — | — | — | — | — | — |
| DBU p-toluenesulfonate | — | — | — | 0.5 | — | — | — | — | — |
| DBU phenolate | — | — | — | — | 0.5 | — | — | — | — |
| DBU oleate | — | — | — | — | — | 0.5 | — | — | — |

TABLE 3-continued

|  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 |
|---|---|---|---|---|---|---|---|---|---|
| DBU | — | — | — | — | — | — | 0.5 | — | — |
| DMEA | — | — | — | — | — | — | — | 0.5 | — |
| TEDA | — | — | — | — | — | — | — | — | 1.0 |
| Molding conditions | | | | | | | | | |
| Vacuum degree (Torr) | 30 | 10 | 30 | 30 | 30 | 30 | 30 | 30 | 30 |
| Water content (parts) | 0.3 | 0.3 | 0.3 | 0.3 | 0.3 | 0.3 | 0.3 | 0.3 | 0.3 |
| Molding results | | | | | | | | | |
| Density (g/cm³) | 0.6 | 0.6 | 0.6 | 0.6 | 0.6 | 0.6 | 0.6 | 0.6 | 0.6 |
| Appearance | Spoiled by shrinkage | Spoiled by shrinkage | Spoiled by shrinkage | Spoiled by shrinkage | Spoiled by shrinkage | Spoiled by shrinkage | Spoiled by shrinkage | Spoiled by shrinkage | Spoiled by shrinkage |

Each formulation had a water content of 0.3 part by weight relative to 100 parts by weight of polyol component, except for the 0.2 or 0.4 part by weight in Example 5, as shown in the molding conditions in Table 2 or 3. In Table 3, DMEA stands for N,N-dimethylethanolamine.

The polyurethane formulation according to each Example or Comparative Example was injected into the cavity 4 having a reduced pressure of 100 Torr or below as shown in the molding conditions in Table 2 or 3, and was foamed to mold an ISF covering 43 on a steering wheel. The core 45 of every ISF covering 43 as molded was found to have a low density of 0.6 g/cm³ or less, as shown in the results of molding in Table 2 or 3. Moreover, all of the molded products of Examples 1 to 10 presented a good appearance not spoiled by any defects, such as shrinkage, bulging or voids, while shrinkage spoiled the appearance of all of the products of Comparative Examples 1 to 9.

Reference is now made to FIGS. 9 to 12 showing a second embodiment of the present invention, which is employed for molding an ISF pad for a steering wheel. The molding apparatus which is employed for carrying out this embodiment differs from the apparatus employed for the first embodiment in that a cavity 4 for molding an ISF pad is defined between a recess in a movable portion 3 and a projection on a stationary portion 2, and that a lower casing 13 is provided with a sealing member 14 adapted to contact the mating surface thereof. In any other respect, the two apparatuses are substantially identical in construction, and like numerals are, therefore, used to indicate like parts throughout all of the drawings showing the two apparatuses, so that no repeated description is provided.

Figure 12:
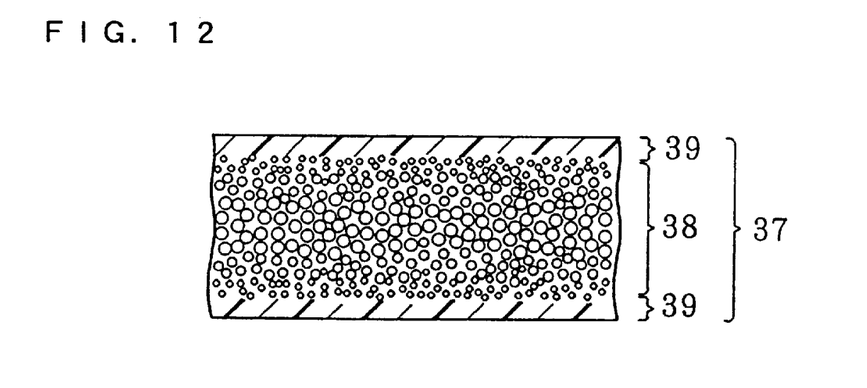
FIG. 12 is a partly enlarged sectional view of an ISF pad as molded.

The polyurethane formulations M prepared by repeating the first embodiment of this invention were each employed for reactive injection molding in the cavity 4 having a reduced pressure of 400 Torr or below (and preferably 100 Torr or below). At the center of the mold area, which is away from the wall surface of the cavity, the injected polyurethane formulation M forms a core 38 having an outstandingly high degree of foaming, while the polyurethane formulation M close to the wall surface forms a solid integral skin 39 having a low degree of foaming such that virtually no bubble remains, as shown in FIG. 12. Thus, an ISF pad 37 as molded has a superior appearance and better physical properties.

The second embodiment provides the same advantages as the above described first embodiment, except those which were peculiar to the ISF covering 43.

It is understood that various changes and modifications may be made in the invention as, for example, those which follows without departing from the spirit and scope thereof.

(1) Although the apparatus in the embodiments is constructed of the mold 1 and the vacuum chamber 11 which are separate from each other, the mold may be of double-wall structure, with the outer wall functioning as the vacuum chamber 11, so that the space is formed in the mold integrally with the mold.

Figure 13:
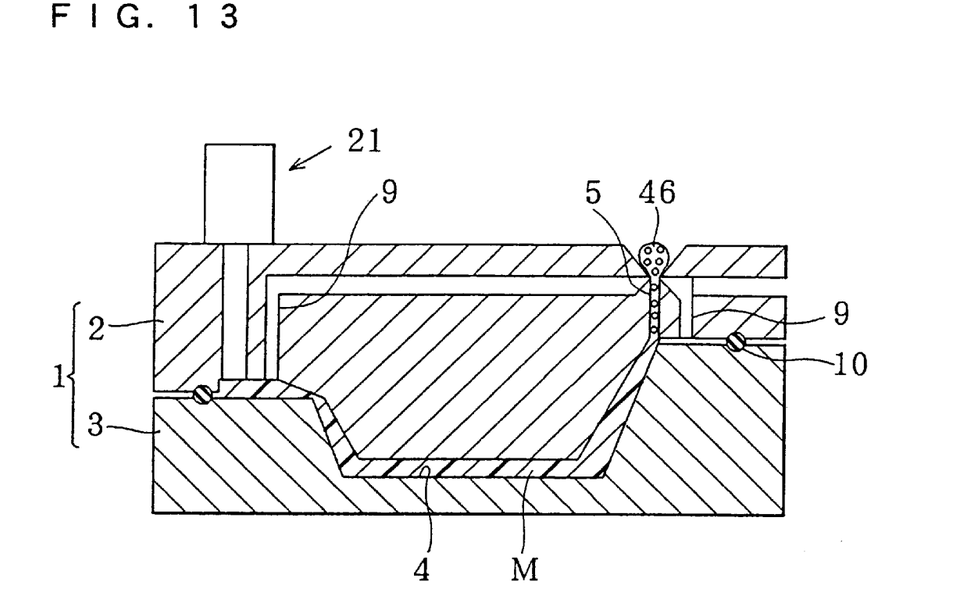
FIG. 13 is a sectional view showing another example of the old.

(2) It is possible to form a groove 9 in all or part of the periphery of the cavity 4 of the mold 1, as shown in FIG. 13, so that the cavity 4 is evacuated through this groove 9. In this case, the groove 9 functions as the space. This groove 9 may be formed in either or both of the stationary portion 2 and the movable portion 3. It is desirable that the groove 9 be isolated from the tmosphere by a sealing member 10.

(3) Although the mold used in the above-mentioned embodiments has a vent hole 5, it is possible to replace the mold by one of another type having a porous core in place of the vent hole, said porous core facing the cavity and being positioned at a place where the injected polyurethane formulation finally reaches. The porous core permits the injected polyurethane formulation to be degassed before molding is completed.

(4) The mold is not limited to that of metal, but it may be replaced by a ceramic mold or resin mold, which withstands the foaming pressure.

(5) The process and polyurethane formulation of this invention can be used for making the inner layer of a product having two colors given by its inner and outer layers.

As many apparently widely different embodiments of this invention may be made without departing from the spirit and scope thereof, it is to be understood that the invention is not limited to the specific embodiments thereof except as defined in the appended claims.

What is claimed is:

1. A process for molding a semi-rigid integral skin foam used for a covering for a steering wheel of a motor vehicle and having a low foamed integral skin layer and a highly foamed core, comprising the steps of:

evacuating a mold cavity to 400 Torr or below;

injecting into said mold cavity a polyurethane formulation comprising a polyol component, an isocyanate component, at least one substance selected from the group consisting of an amine salt of formic acid and an amine salt of boric acid; and foaming said polyurethane formulation to fill said cavity by reacting said isocyanate with said amine salt to produce $CO_2$ bubbles and thereby form a highly foamed core having a density of not more than 0.6 g/cm$^3$ composed of fine cells, and said low foamed integral skin layer;

wherein said formulation excludes freon.

2. A process as set forth in claim 1, wherein said formulation has a water content not exceeding one part by weight relative to 100 parts by weight of said polyol component.

3. A process as set forth in claim 1, wherein said formulation contains said substance in the amount of 0.03 to 5.0 parts by weight relative to 100 parts by weight of said polyol component.

* * * * *